US010783379B2

(12) United States Patent
Savvides et al.

(10) Patent No.: US 10,783,379 B2
(45) Date of Patent: Sep. 22, 2020

(54) METHOD FOR NEW PACKAGE DETECTION

(71) Applicant: Bossa Nova Robotics IP, Inc., Pittsburgh, PA (US)

(72) Inventors: Marios Savvides, Wexford, PA (US); An Pang Lin, Mountain View, CA (US); Shreyas Venugopalan, Pittsburgh, PA (US); Ajmal Thanikkal, Pittsburgh, PA (US); Karanhaar Singh, West Windsor, NJ (US); Gavriel Adler, Brookline, MA (US); Kyle Neblett, Brookline, MA (US); Christopher Palmer, Pittsburgh, PA (US)

(73) Assignee: BOSSA NOVA ROBOTICS IP, INC., Pittsburgh, PA (US)

( * ) Notice: Subject to any disclaimer, the term of this patent is extended or adjusted under 35 U.S.C. 154(b) by 94 days.

(21) Appl. No.: 16/109,533

(22) Filed: Aug. 22, 2018

(65) Prior Publication Data
US 2019/0065861 A1 Feb. 28, 2019

Related U.S. Application Data

(60) Provisional application No. 62/549,368, filed on Aug. 23, 2017.

(51) Int. Cl.
*G06K 9/00* (2006.01)
*G06F 16/783* (2019.01)

(52) U.S. Cl.
CPC ....... *G06K 9/00771* (2013.01); *G06F 16/784* (2019.01); *G06K 9/00362* (2013.01); *G06K 9/00369* (2013.01); *G06K 9/00979* (2013.01)

(58) Field of Classification Search
CPC .......... G06K 9/00979; G06K 9/00362; G06K 9/00771; G06K 9/3241; G06F 17/30793; G08B 13/19608; H04N 7/186; H04N 7/181; G06T 7/246
USPC ..... 382/103, 105, 190; 348/159; 384/208.12
See application file for complete search history.

(56) References Cited

U.S. PATENT DOCUMENTS

| 2005/0271277 | A1 | 12/2005 | Lin et al. |
| 2006/0227862 | A1 | 10/2006 | Campbell et al. |
| 2012/0213490 | A1 | 8/2012 | Steiner |
| 2013/0208124 | A1* | 8/2013 | Boghossian ......... G06K 9/3241 348/159 |
| 2016/0044286 | A1 | 2/2016 | Saptharishi et al. |
| 2016/0180667 | A1 | 6/2016 | Bunker et al. |

(Continued)

FOREIGN PATENT DOCUMENTS

WO 2009/070662 6/2009

*Primary Examiner* — Phuoc H Doan
(74) *Attorney, Agent, or Firm* — David R. Stevens; Stevens Law Group

(57) ABSTRACT

A method for processing arrival or removal of packages within the field of view of a video camera includes providing a database for recording packages placed in the field of view. Based on real-time analysis of successive image frames in the camera, a human person's entry and exit from the field of view of the camera is also detected. Delivery or removal of objects is recorded in the database. In one embodiment, the method also determines whether or not a newly arrived package is placed alongside or on top of an existing package.

20 Claims, 4 Drawing Sheets

(56) References Cited

U.S. PATENT DOCUMENTS

2017/0220872 A1      8/2017   Child et al.
2018/0268240 A1*   9/2018   Loce ................. G06K 9/00228

* cited by examiner

METHOD FOR NEW PACKAGE DETECTION

CROSS-REFERENCE TO RELATED PATENT APPLICATION

The present disclosure is part of a non-provisional patent application claiming the priority benefit of U.S. Patent Application No. 62/549,368, titled "Method For New Package Detection", filed Aug. 23, 2017.

FIELD OF THE INVENTION

This invention relates generally to security surveillance technology. In particular, the present invention relates to security surveillance system which efficiently uses a video camera for object recognition locally and remote network resources for registering and monitoring events and other security applications.

BACKGROUND

Existing camera-equipped home security systems are expensive, requiring both remote servers to process the captured images and unnecessary human intervention. For example, in a typical object detection application, an object is detected in an image by classifying image patches across various shifts and across a variety of image scales. Specifically, if a pedestrian is to be detected, a typical system first generates a scale-space image pyramid to obtain images at various resolutions and to detect the pedestrian in all possible fixed-size windows across these images. Typically, great computational cost must be incurred to allow a system to robustly determine if an object is in an image and to classify objects at all locations and at all resolutions.

In many applications, it is desired that the video camera carry out local object detection functions to more efficiently use computational resources, and thereby to decrease costs and to increase system capacity.

SUMMARY

According to one embodiment of the present invention, a method for processing arrival or removal of an object within the field of view of a video camera includes: (a) providing a database for recording objects residing in the field of view; (b) based on real-time analysis of successive image frames in the camera, detecting a human person's entry into the field of view of the camera; (c) saving a first set of image frames, corresponding image frames captured by the video camera immediately prior to the detection of the human person's entry into the field of view of the camera; (d) based on real-time analysis of successive image frames in the camera, detecting a human person's exit from the field of view of the camera; (e) saving a second set of image frames, corresponding to image frames captured by the video camera immediately after the detection of the human person's exit from the field of view of the camera; (f) comparing the first set of image frames with the second set of image frames to identify one or more objects that appear or disappear from the field of view based on difference between the first and the set of image frames; (g) determining and eliminating objects identified by comparing the first and second sets of image frames as artifacts; (h) determining from the objects remaining and the objects residing in the database: (1) whether or not one of the objects residing in the database has been removed; and (2) whether or not an object has newly arrived; and (i) entering any newly arrived objects into the database and removing any objects residing in the database that have been determined to have been removed. In one embodiment, the method also determines whether or not the newly arrived object is placed alongside or on top of an existing object residing in the database. The objects may be, for example, packages that are delivered or collected.

According to one embodiment of the present invention, the artifacts may correspond, for example, to change in lighting conditions, change in lighting conditions due to the opening or shutting of a door or change in other conditions.

According to one embodiment of the present invention, a block-based discrete cosine transform on each of the first set of image frames and the second set of image frames is computed to determine therefrom a change in spatial frequencies.

According to one embodiment of the present invention, differences in light intensities between corresponding pixels of the first and the second sets of image frames are computed. In one embodiment, accumulated differences over predetermined corresponding regions are computed from the computed differences in light intensity.

According to one embodiment of the present invention, determining from the objects remaining and the objects residing in the database includes computing one or more intersections between each object remaining and each object residing in the database. The intersections may be, for example, an intersection in shape between objects or an intersection in location between objects.

In one embodiment, further identification between the newly identified objects and the existing objects in the database comprises comparing color histograms between the currently identified objects and the existing objects in the database.

In another embodiment, a method for package detection includes the steps of providing a database for recording packages in the field of view. Based on real-time analysis of successive image frames in the camera, a human person's entry and exit from a field of view of the camera can be detected. After the human person's entry and exit, whether packages have been removed or added is determined by computing one or more intersections between each package remaining and each package residing in the database. Added packages are entered into the database and information relating to removed packages residing in the database are removed. In some embodiments, a change detection module and a bounding box filtering module can be used to artifacts and/or eliminate bounding boxes unlikely to surround packages.

In another embodiment, a system for processing arrival or removal of an object within the field of view of a video camera can include a database module for recording objects residing in the field of view. A detection module is used to determine a human person's entry into the field of view of the camera based on real-time analysis of successive image frames in the camera, with the detection module saving a first set of image frames corresponding to image frames captured by the video camera immediately prior to the detection of the human person's entry into the field of view of the camera and saving a second set of image frames corresponding to image frames captured by the video camera immediately after the detection of the human person's exit from the field of view of the camera. A comparison module can be used to compare the first set of image frames with the second set of image frames to identify one or more objects that appear or disappear from the field of view based on differences between the first and the set of image frames. An artifact elimination module can be used to determine and eliminate objects identified by comparing the first and second sets of image frames as artifacts. In operation, the database module records (a) whether or not one of the objects residing in the database has been removed; (b) whether or not an object is newly arrived; and c) enters any newly arrived objects into the database and removes any objects residing in the database that have been determined to have been removed.

BRIEF DESCRIPTION OF THE DRAWINGS

The specific features, aspects and advantages of the present invention will become better understood with regard to the following description and accompanying drawings where.

DETAILED DESCRIPTION

A security surveillance system which efficiently uses the computational power of a processor in a video camera to perform object detection and identification is disclosed in U.S. Pat. No. 9,928,708, Ser. No. 14/968,714, entitled "Real-time Video Analysis for Security Surveillance," filed on Dec. 14, 2015, the disclosure of which is hereby incorporated by reference in its entirety. In that security surveillance system, the local video camera system performs real-time detection and identification of persons and objects (e.g., a package left by a courier) within the field of view of the video camera.

Figure 1:
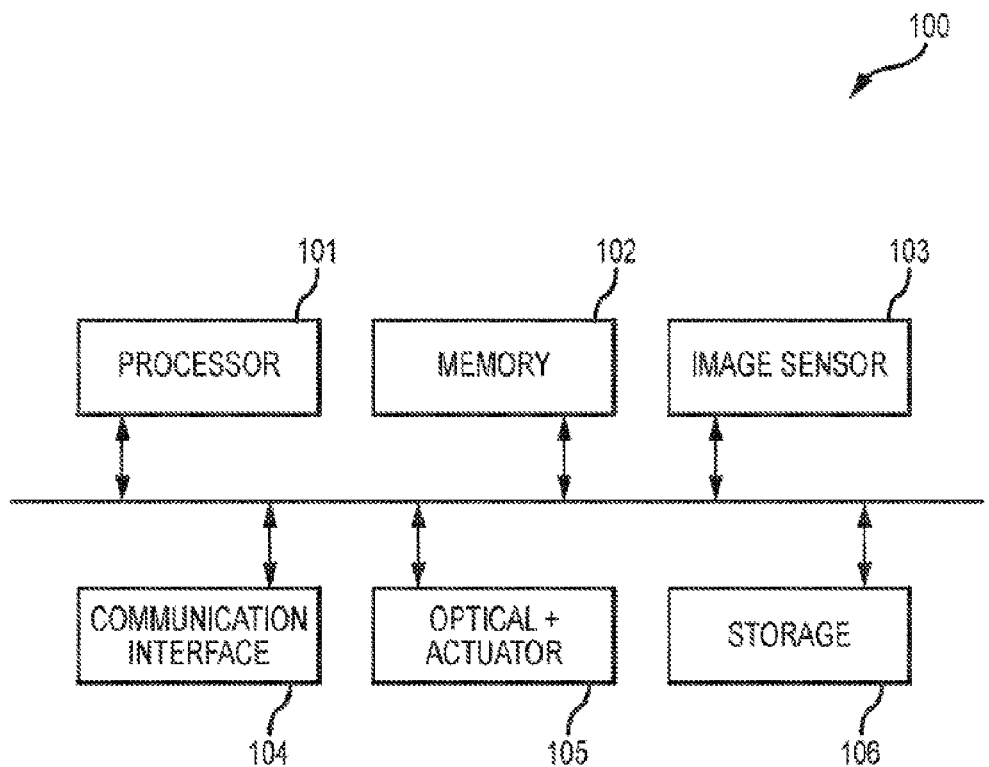
FIG. 1 illustrates a camera system suitable for identification of packages left or removed.

As seen in FIG. 1, a camera system 100 that can be used to implement the disclosed system and method can be an "IP camera" (i.e., a camera capable of communicate using the Internet Protocol), a USB camera (i.e., a camera having a Universal Serial Bus interface), or a camera capable of communicating with another device by any suitable means. As shown in FIG. 1, camera 100 includes processor 101, memory 102, image sensor 103, communication interfaces 104, camera optical and actuator system 105, and storage 106. Processor 101 controls the overall operations of the camera, such as operating camera optical and actuator system 105, and communication interfaces 104. Camera optical and actuator system 105 controls the operations of the camera, such as exposure control for image captured at image sensor 103. Camera optical and actuator system 105 may include a fixed lens system or an adjustable lens system (e.g., zoom and automatic focusing capabilities). Camera can be fixedly or movably mounted to point downwardly or upwardly. In certain embodiments a wide field or fish-eye camera can be used. Alternatively, a narrow field, zoomable telephoto camera or a high resolution, tilt controllable, height adjustable camera can be used.

In some embodiments, camera optical and actuator system 105 may include or be associated with an infrared (IR) illumination system (e.g., IR light from light-emitting diodes (LED)) or any suitable illumination system for supplementing light when an environment does not provide sufficient illumination (e.g., at night)). In certain embodiments multiple cameras and/or LEDs can be used to reduce glare from highly reflective surfaces, since multiple cameras pointed in slightly different directions can result in at least one image with little or no glare. Lights can be mounted along with, or separately from, the sensors, and can include monochromatic or near monochromatic light sources such as lasers, light emitting diodes (LEDs), or organic light emitting diodes (OLEDs). Broadband light sources may be provided by multiple LEDs of varying wavelength (including infrared or ultraviolet LEDs), phosphor supported white LEDs, halogen lamps or another suitable conventional light source. Various spectral filters that may include narrowband, wideband, or polarization filters and light shields, lenses, mirrors, reflective surfaces, diffusers, concentrators, or other optics can provide wide light beams for area illumination or tightly focused beams for improved local illumination intensity.

According to some embodiments, both cameras and lights can be movably mounted. For example, hinged, rail, electromagnetic piston, or other suitable actuating mechanisms used to programmatically rotate, elevate, depress, oscillate, or laterally or vertically reposition cameras or lights.

Image sensor 103 captures images under control of processor 101 from light from the environment entering camera 100. The camera is capable of capturing the images from the environment. Sensor 103 may provide a color image or a gray-scale image. In certain embodiments, conventional RGB CMOS or CCD sensors can be used, alone or in combination with spectral filters that may include narrowband, wideband, or polarization filters. Embodiments can also include sensors capable of detecting infrared, ultraviolet, or other wavelengths to allow for hyperspectral image processing. This can allow, for example, monitoring and tracking of markers, labels or guides that are not visible to people, or using flashing light in the invisible spectrum to reduce energy consumption and motion blur.

Communication interfaces 104 typically include one or more communication interfaces (e.g., a network interface, a USB interface) which allows image data to be transferred from storage 106 to a communicating external device (e.g., a computer). Storage 106 provides non-volatile storage (e.g., archived images and software). Memory 102 provides run-time memory support for processor 101, such as frame buffers for image processing operations According to one embodiment of the present invention, memory 102 may be allocated to include multiple memory spaces. such as a manufacturer's memory space, a developer's memory space, and a user memory space. The manufacturer's memory space may be provided for system software provided by the camera manufacturers, such as firmware for operating camera system 100. The user memory space may be used, for example, for allocating frame buffers for image processing. Frame buffers are typically allocated for holding image data captured by image sensor 103. Such image data may include, for example, frame buffers holding consecutive frames of images. In one embodiment, at least 50 megabytes are allocated for frame buffers in the user memory space for two more consecutive frames of images. The developer's memory space may be used, for example, for holding software modules executed by processor 101 for carrying out a system or a method of the present invention.

Figure 2A:
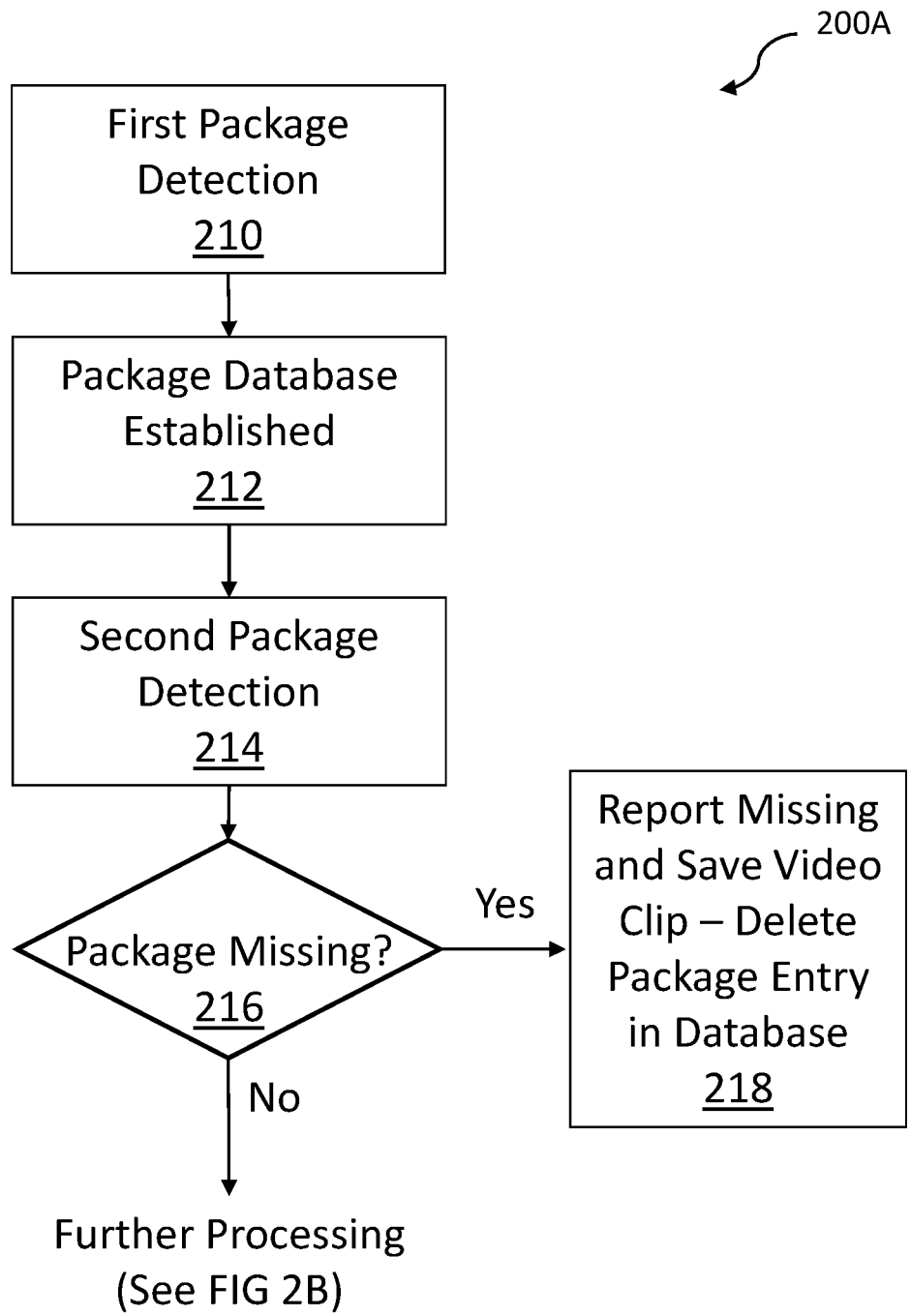
FIGS. 2A, 2B, and 2C collectively form a flow chart illustrating the operations of the processor in the camera for identification of packages left or removed
Figure 2B:
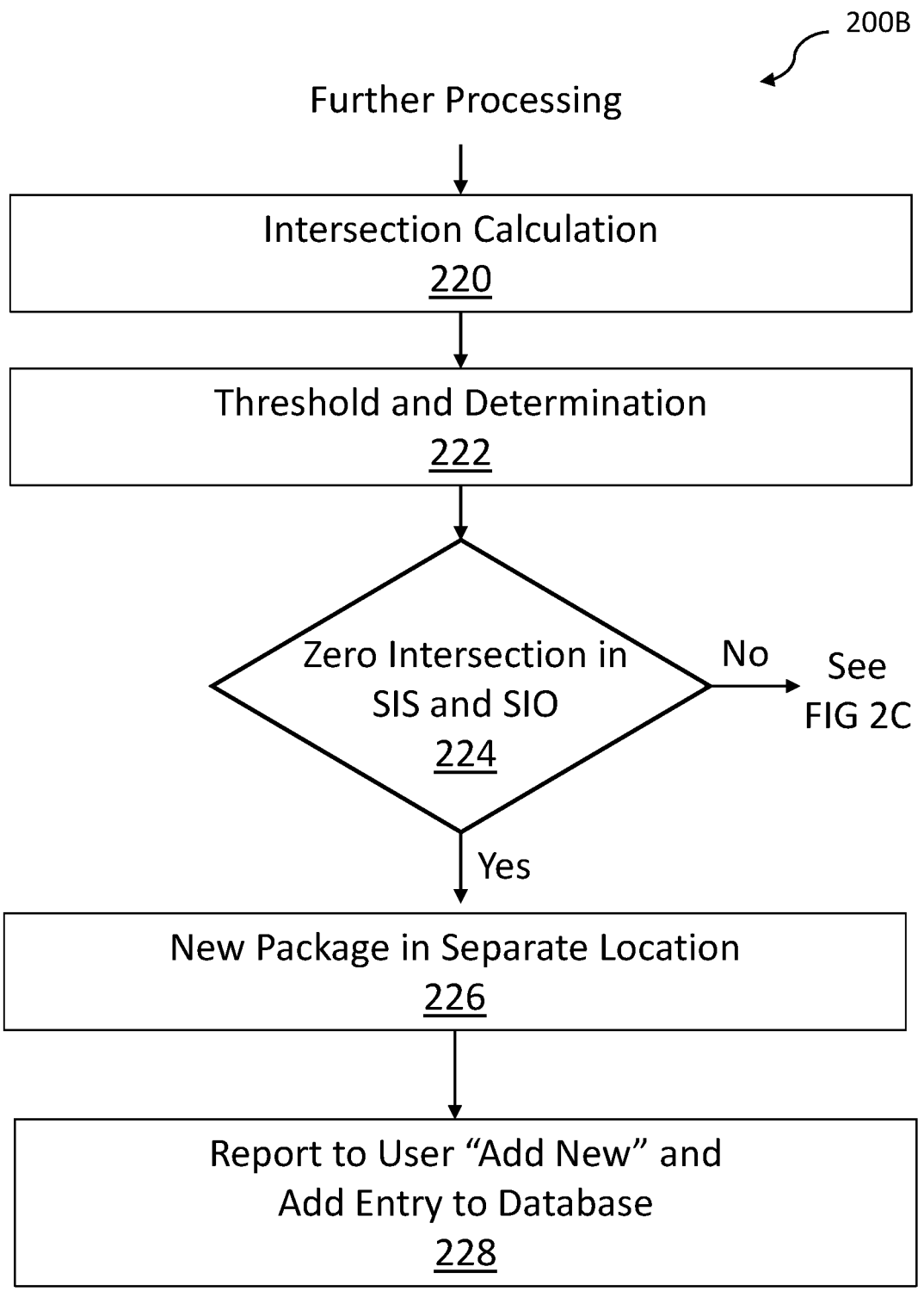
Figure 2C:
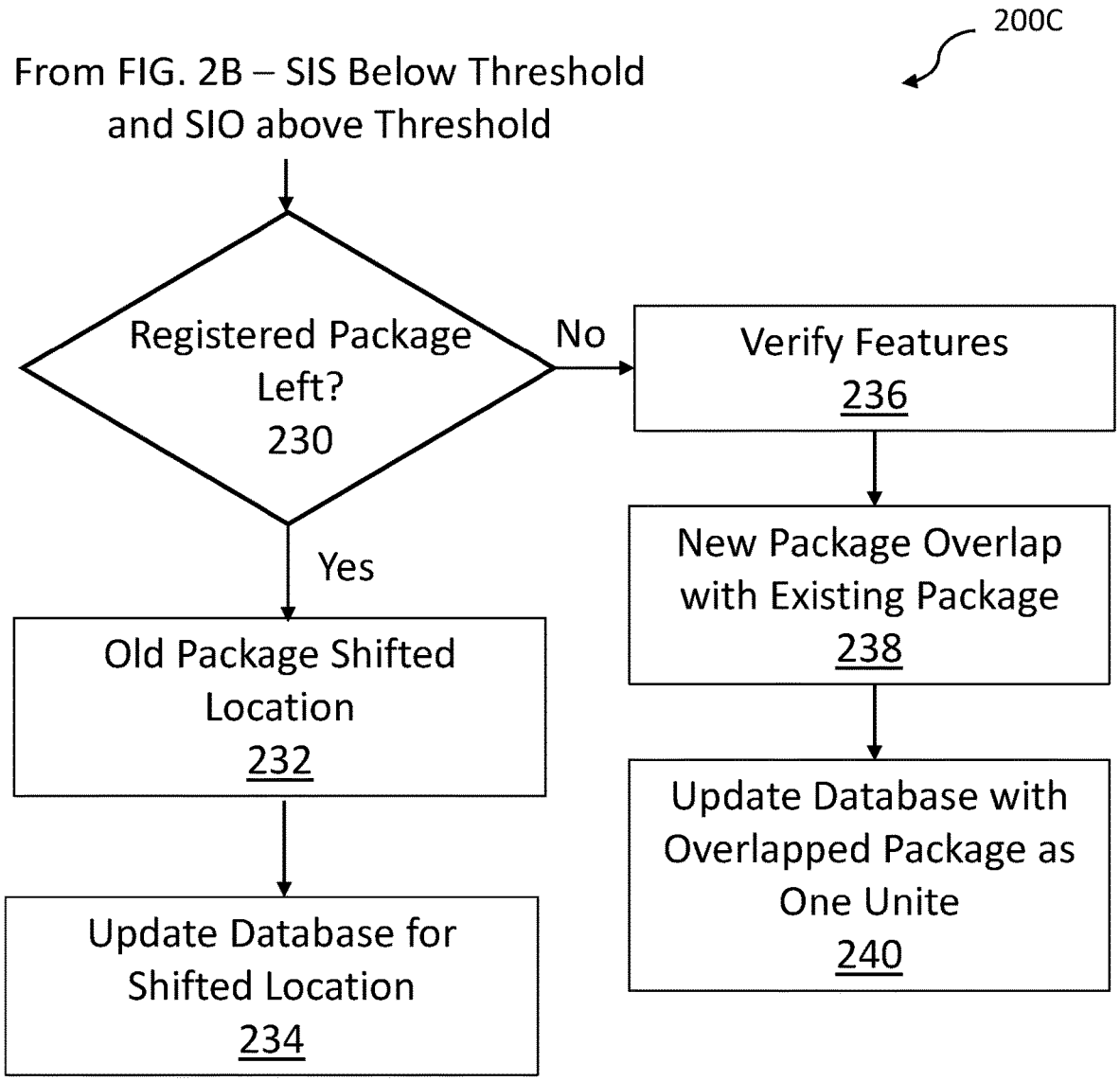

According to one embodiment of the present invention illustrated with respect to FIGS. 2A, 2B, and 2C, a database in the video camera stored in a memory module accessible by the processor is initialized to record packages that have been detected within the video camera's field of view. Initially, the database contains no packages. Upon initialization, using the techniques disclosed in U.S. Pat. No. 9,928,708, the processor detects the arrival of the first package. For example, video frames from camera system 100 can be sent to a change detection module. Bounding boxes are created to surround potential objects. Instead of immediately classifying objects in the bounding boxes, a bounding box filtering module can be used to eliminate bounding boxes unlikely to surround objects of interest. The remaining bounding boxes can then have contained objects classified and/or identified in a filtered detection step.

In operation, the change detection module takes in a raw frames and subjects them to image preprocessing that can include, but is not limited to, blurring, sharpening, down-sizing, upsizing, morphological operations including rotation or stretching, and color or wavelength filtering. In some embodiments, color depth of video frame data in the frame buffers can be reduced, for example by conversion color to gray-scale. Such a conversion may be carried out in one of numerous ways. For example, image data may be represented by the RGB, the RGBA, or one of many industry standard image data formats under various color space representations. Typically, these data formats are expressed in multiple data channels, with one of the channels used to represent intensity. Alternatively, the intensity of each pixel may be derived from the image data in two or more of the channels. For example, under the RGB format, the intensity is a known weighted average of all three channels. Conversion from image data in industry standard image data to grey-scale data based on intensity is known to those skilled in the art. (Some cameras also provide a separate gray-scale channel for their color pictures.) In some embodiments, down-sampling by 4 (e.g., reduction by a factor of 2 in each dimension of the 2-dimensional image) is achieved by simply sampling every other pixels in each dimension, which enables a potential approximate speedup by a factor of 4.

After preprocessing of the video frames, bounding boxes corresponding to recent changes in the scene can be determined. These changes correspond to both valid moving objects and false detections or noise. In one embodiment, an object of interest segmentation algorithm can use a background differentiation approach in order to estimate new objects that have entered the scene. Such an algorithm utilizes the difference between consecutive frames to identify moving objects in the scene. This difference image is then thresholded to determine bounding boxes for potential objects. Since the algorithm does not need to model the background directly, it responds quickly to changes.

The bounding box filtering module performs filtering based on the bounding box properties to remove false detections and keep valid detections. Bounding box classification is necessary in order to determine whether the detected region corresponds to a valid detected object or to irrelevant changes not caused by moving objects (e.g. lighting changes). The algorithm can be trained off-line to learn the decision boundary between valid and invalid objects based on training samples. The features used to discriminate can include combinations of size, aspect ratio, and location of the bounding box within the frame. The feature vector is then fed into a decision tree classification component, which rejects or accepts the bounding box.

Advantageously, computation of any features from actual pixel data is not required by the bounding box filtering module, allowing the filtering to be decoupled from the change detection module. This feature, along with use of a tree classification procedure that only requires object detection if needed, greatly improves overall computation speed. In effect, valid moving objects can be detected, identified, and tracked against a variety of background by first filtering out nearly all invalid detections such as plant motions, environmental noise, and sudden lighting changes. The described system requires no on-device learning time or adjustment period, unlike conventional background modeling-based approaches.

After eliminating invalid detections and/or bounding boxes, valid detections can be assumed to include packages left or removed by human beings coming into and leaving the camera's field of view. Accordingly, the processor related to the video camera replaces a set of image frames that includes a background model or a "region of interest" at the rate decided by the camera capacity and program pre-set (such as by a non-limiting example of 2-5 frames per second). The set of images are analyzed in real-time using known techniques (e.g., characteristic speeds and aspect ratios) to detect the appearance of a human person.

Upon detecting a human appearing in the captured images, (e.g., at time "t-entry"), the processor saves the set of one or more image frames ("M-entry") corresponding to the background model captured immediately prior to entry of the human. M-entry serves as the set of baseline image frames that allow further processing. The processor then analyzes successive captured images under a "pedestrian detection model" to determine whether or not the previously detected human has left the scene. Within a predetermined time interval immediately after detecting the human leaving the scene (e.g., at time "t-exit"), a set of one or more image frames ("M-exit") of the same scene is captured.

The processor computes an intensity difference ("M-difference") between the sets of image frames M-entry and M-exit. A thresholding step may then be performed to ensure insignificant intensity differences are eliminated from M-differences. The processor may also sum all the individual M-differences within predetermined regions (e.g., 10 pixels by 10 pixels blocks) to generate the resulting "accumulated M-difference". The processor then filters the accumulated M-differences to remove the intensity differences due to change in lighting. In one embodiment, a block-based discrete cosine transform (DCT) is computed for each pixel block in M-entry and M-exit. Spatial frequency changes obtained by subtracting corresponding blocks after DCT in M-entry and M-exit are examined. Accumulated M-differences where the spatial frequency changes are less than a predetermined value may be zeroed.

In embodiments where the camera's field of view includes an entry way of a building, lighting changes resulting from door opening and shutting conditions (e.g., a person leaving the building or entering the building) affect the image frames in M-entry and M-exit. Effects due to door conditions must be learned, identified and eliminated from the accumulated M-differences. For example, in one embodiment, a detected package candidate (described below) having 15% or more of its expected image area outside the region of the interest is removed as a door condition artifact.

After filtering for known artifacts, the accumulated M-differences are further processed to identify package candidates in a first step 210 of method 200A as illustrated in FIG. 200. A package is established in a database (step 212) and second or additional packages can also be established in the database (step 214). Where no similarity in shape is found matching the newly identified package with an existing package in the database, the processor may recognize a newly arrived package and new entry is added to the database. The user may also be appropriately notified about the newly arrived package.

Missing package detection is also possible (step 216). If a package in the database is removed without authorization or by identified users, the package can be reported as missing and relevant video clips saved for analysis or report to police or other parties. A missing package can be deleted from the database (step 218). In one embodiment the entry in the database is removed and the user is notified of the removal using the same means as that used for informing the user of an arrival of a package. In another embodiment, a video clip of the event (i.e., the image sequence between times t-entry and t-exit) can be saved locally at the camera or remotely in a file server connected to the camera by a computer network. The video clip can also be transmitted to the user. If the package is not missing, further processing is possible as seen with respect to FIG. 2B.

In some embodiments, package candidates are identified from all the regions having a high frequency texture change between M-exit and M-entry. Each package candidate may be identified by a set of spatial coordinates. For example, in one embodiment, each package candidate is represented by a sequence of spatial coordinates (e.g. (x1, y1), (x2, y2), (x3, y3), . . . ). The processor calculates the size of the region corresponding to the package candidate from the sequence of spatial coordinates. The process may remove package candidates having sizes that do not exceed a threshold. The processor may also eliminate any package candidate having aspect ratio and occupancy ratios that are outside the respective threshold values to eliminate the effects of shadows and the effects of irregular shape packages, respectively. The package candidates remaining after the various filters above are then recorded in the local database (i.e., inside the camera) as packages. If the database is empty, the first package identified is presumed the first detected package since initialization. The arrival of the package may also be announced through any appropriate means (e.g., through an email server accessed over the internet or a wireless communication network).

In one embodiment, each package is represented by its sequence of spatial coordinates, the associated image frame sets M-entry and M-exit, and a unique assigned identification number.

For each package that is currently identified at a time when the database is not empty, each currently identified package is matched to the package or packages already in the database. Specifically, as seen with respect to method 200B of FIG. 2B, the processor looks for intersection between currently identified packages with packages already recorded in the database based on their respective spatial coordinates (step 220). Each currently identified package is examined under two different types of intersection: intersection in shape (i.e. similarity in shape "SIS") and intersection in location. An intersection in shape pertains to size and shape of the package. An intersection in location pertains to the space occupied by the comparing packages (i.e. significant in overlap "SIO"). In addition to the intersection, the processor may also compare their respective color histograms, and the spatial frequency changes between M-exit with the M-entry. Other features may also be used to help match previously recorded packages with the currently identified packages. System parameters governing the intersection (e.g., thresholds of the intersection) are specified by the user or the administrator or learned empirically using any appropriate learning technique (step 222).

When a currently identified package has zero (or below threshold) SIS or SIO intersections with the packages already in the database (step 226), the package is determined to be a new arrival. The package will be entered into the database in the same manner as described above for the arrival of the first package, after being assigned the unique identification number. The user may also be informed appropriately. When some degree of intersection in shape or in location is found with a package already in the database, the processor calculates a figure-of-merit for each of the intersection types. When both shape and location intersections between a currently identified package and a package in the database are found to be significant (i.e., significant similarity in shape and significant overlap in location), other similarity features are compared (e.g., their respective color histograms and spatial frequency changes). If these features are consistent and only a change in location is found, the processor may determine that an existing package has shifted in location (step 226). The location for the existing package can examined to ensure that the previous package is no longer associated with the previous sequence of spatial coordinates. In that case, the sequence of spatial coordinates in the database associated with the existing package is updated.

Alternatively or in addition, as seen with respect to method 200C of FIG. 2C, a determination can be made as to whether a database registered package has been left (step 230) when SIS is below threshold and SIO is above threshold. A determination can be made as to whether an old package has shifted location (step 232), in which case the database is updated for the shifted location (step 234).

Alternatively, based on verified features or differences found (step 236), the processor may determine that a newly arrived package is placed on top of an existing package (step 238). The newly arrived package is entered in the database in substantially the same manner as the first arrival package. In one embodiment, a convex hull of the combination of regions occupied by the newly identified and the existing package is also recorded in the database. For both the newly identified package and the existing package, the associated M-entry the set of images frames saved at time t-entry of the existing package, and the M-exit is the set of image frames saved at time t-exit of the newly identified package. Alternatively, in one embodiment, the two packages are represented as a single package and the database updated (step 240). The user can be appropriately notified about the newly arrived package.

As will be understood, the camera system and methods described herein can operate locally or in via connections to either a wired or wireless connect subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) that can allow for local data storage of user-specified preferences or protocols. In one particular embodiment, multiple communication systems can be provided. For example, a direct Wi-Fi connection (802.11b/g/n) can be used as well as a separate 4G cellular connection.

Connection to remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In certain embodiments, processing related to one or more of video frame preprocessing, motion detection, change detection, bounding box creation, filtering of potential objects, or classification/identification can be performed at a remote server. For example, local processing can be used for video frame preprocessing, motion detection, change detection, bounding box creation, filtering of potential objects, package database detection and updates. Computationally difficult package or person classification/identification not locally processed can be done using the remote server or other cloud computing facility.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A method for processing arrival or removal of an object within the field of view of a video camera, comprising:
providing a database for recording objects residing in the field of view;
based on real-time analysis of successive image frames in the camera, detecting a human person's entry into the field of view of the camera;
saving a first set of image frames, corresponding image frames captured by the video camera immediately prior to the detection of the human person's entry into the field of view of the camera;
based on real-time analysis of successive image frames in the camera, detecting a human person's exit from the field of view of the camera;
saving a second set of image frames, corresponding to image frames captured by the video camera immediately after the detection of the human person's exit from the field of view of the camera;
comparing the first set of image frames with the second set of image frames to identify one or more objects that appear or disappear from the field of view based on difference between the first and the set of image frames;
determining and eliminating objects identified by comparing the first and second sets of image frames as artifacts;
determining from the objects remaining and the objects residing in the database: (a) whether or not one of the objects residing in the database has been removed; and (b) whether or not an object has newly arrived; and
entering any newly arrived objects into the database and removing any objects residing in the database that have been determined to have been removed.

2. The method of claim 1, wherein the objects comprise packages that are delivered or collected.

3. The method of claim 1, wherein the artifacts correspond to change in lighting conditions.

4. The method of claim 1, wherein the artifacts correspond to change in lighting conditions due to the opening or shutting of a door.

5. The method of claim 1, further comprising determining whether or not the newly arrived object is placed alongside or on top of an existing object residing in the database.

6. The method of claim 1, wherein comparing the first and second sets of image frames comprises computing a block-based discrete cosine transform on each of the first set of image frames and the second set of image frames to determine therefrom a change in spatial frequencies.

7. The method of claim 1, wherein comparing the first and second sets of image frames comprises computing differences in light intensity between corresponding pixels in the first set of image frames and the second set of image frames.

8. The method of claim 7, further comprising computing accumulated differences for predetermined corresponding regions in the computed differences in light intensity.

9. The method of claim 1, wherein determining from the objects remaining and the objects residing in the database comprises computing one or more intersections between each object remaining and each object residing in the database.

10. The method of claim 9, wherein the computed intersections comprise an intersection in shape between objects.

11. The method of claim 9, wherein the computed intersections comprise an intersection in location between objects.

12. The method of claim 1, wherein the determining from the objects remaining and the objects residing in the database comprises comparing color histograms.

13. A method for package detection, comprising:
providing a database for recording packages in a field of view of a camera;
based on real-time analysis of successive image frames captured by the camera, detecting a human person's entry into the field of view and subsequently detecting the human person's exit from the field of view;
after the human person's exit, comparing a first set of image frames captured by the camera prior to detecting the human person's entry to a second set of image frames captured subsequent to detecting the human persons exit to identify whether packages have been removed or added to the field of view by computing one or more intersections between each package remaining and each package residing in the database;
determining and eliminating identified packages by comparing the first set of image frames and the second set of image frames as artifacts; and
based on the remaining packages and packages recorded in the database, entering any added packages into the database and removing packages residing in the database that have been determined to have been removed.

14. The method of claim 13, wherein the computed intersections comprise an intersection in shape between objects.

15. The method of claim 13, wherein the computed intersections comprise an intersection in location between objects.

16. The method of claim 13, further comprising determining whether or not the newly arrived object is placed alongside or on top of an existing object residing in the database.

17. The method of claim 13, wherein comparing a first set of image frames and a second set of image frames comprises computing a block-based discrete cosine transform on each of the first set of image frames and the second set of image frames to determine therefrom a change in spatial frequencies.

18. The method of claim 13, further comprising use of a change detection module to define a bounding box around an object and determine whether it is a package.

19. The method of claim 13, further comprising a change detection module and a bounding box filtering module to eliminate bounding boxes unlikely to surround packages.

20. A system for processing arrival or removal of an object within the field of view of a video camera, comprising:
- a database module for recording objects residing in the field of view;
- a detection module to determine a human person's entry into the field of view of the camera based on real-time analysis of successive image frames in the camera, with the detection module saving a first set of image frames corresponding to image frames captured by the video camera immediately prior to the detection of the human person's entry into the field of view of the camera and saving a second set of image frames corresponding to image frames captured by the video camera immediately after the detection of the human person's exit from the field of view of the camera;
- a comparison module to compare the first set of image frames with the second set of image frames to identify one or more objects that appear or disappear from the field of view based on differences between the first and the set of image frames;
- an artifact elimination module to determine and eliminate objects identified by comparing the first and second sets of image frames as artifacts; and
- wherein the database module records (a) whether or not one of the objects residing in the database has been removed; and (b) whether or not an object is newly arrived; and
- c) enters any newly arrived objects into the database and removes any objects residing in the database that have been determined to have been removed.

* * * * *